United States Patent
Ladang et al.

[11] Patent Number: 6,001,487
[45] Date of Patent: Dec. 14, 1999

[54] GLAZING ASSEMBLY HAVING A THERMALLY, ELECTRICALLY AND/OR ELECTROCHEMICALLY ACTIVE SYSTEM

[75] Inventors: Michel Ladang, Herve; Dominique Petit, Blegny, both of Belgium; Christian Padoy, Gonesse, France

[73] Assignees: Saint-Gobain Vitrage, Courbevoie, France; Norton Performance Plastics S.A., Chaineux, Belgium

[21] Appl. No.: 08/953,246

[22] Filed: Oct. 17, 1997

[30] Foreign Application Priority Data

Oct. 17, 1996 [FR] France ................................. 96 12655
Dec. 19, 1996 [FR] France ................................. 96 15631

[51] Int. Cl.$^6$ ................................................. B32B 15/00
[52] U.S. Cl. .......................................... 428/432; 428/344
[58] Field of Search ...................................... 428/432, 344

[56] References Cited

U.S. PATENT DOCUMENTS

| | | | |
|---|---|---|---|
| 4,551,372 | 11/1985 | Kunert | 428/38 |
| 4,571,278 | 2/1986 | Kunert | 156/108 |
| 4,581,276 | 4/1986 | Kunert et al. | 428/157 |
| 4,822,680 | 4/1989 | Catalano et al. | 428/432 |
| 4,844,591 | 7/1989 | Arribart et al. | 350/357 |
| 5,124,833 | 6/1992 | Barton et al. | 359/269 |
| 5,208,095 | 5/1993 | Nietering | 428/215 |
| 5,229,040 | 7/1993 | Desbat et al. | 252/583 |
| 5,231,531 | 7/1993 | Defendini et al. | 359/275 |
| 5,244,557 | 9/1993 | Defendini et al. | 204/192.29 |
| 5,271,994 | 12/1993 | Termath | 428/216 |
| 5,283,310 | 2/1994 | Armand | 528/30 |
| 5,302,648 | 4/1994 | Fujimoto et al. | 524/200 |
| 5,324,374 | 6/1994 | Harmand et al. | 156/102 |
| 5,370,913 | 12/1994 | Lin | 428/13 |
| 5,418,025 | 5/1995 | Harmand et al. | 428/38 |
| 5,437,811 | 8/1995 | Doane et al. | 252/299.01 |
| 5,501,919 | 3/1996 | Paul et al | 429/192 |
| 5,507,965 | 4/1996 | Padoy et al. | 252/62.2 |
| 5,529,848 | 6/1996 | D'Erruci | 428/432 |
| 5,615,040 | 3/1997 | Watanabe | 359/288 |
| 5,657,149 | 8/1997 | Buffat et al. | 359/275 |
| 5,663,829 | 9/1997 | Lefrou et al. | 359/275 |
| 5,694,144 | 12/1997 | Lefrou et al. | 345/49 |
| 5,716,694 | 2/1998 | Jacquemet | 428/192 |
| 5,723,196 | 3/1998 | Cornils | 428/122 |
| 5,776,603 | 7/1998 | Zagdown et al. | 428/432 |

FOREIGN PATENT DOCUMENTS

| | | |
|---|---|---|
| 0238164 | 9/1987 | European Pat. Off. . |
| 718667 | 12/1995 | European Pat. Off. . |
| 2 691 550 | 11/1993 | France . |
| 2746934 | 3/1996 | France . |
| WO 93/02380 | 2/1993 | WIPO . |
| WO 93/09460 | 5/1993 | WIPO . |
| WO 96 31445 | 10/1996 | WIPO . |

OTHER PUBLICATIONS

Patent Abstracts of Japan, vol. 15, No. 133, Apr. 2, 1991, Application No: 01152532.

*Primary Examiner*—Deborah Jones
*Assistant Examiner*—Cathy F. Lam
*Attorney, Agent, or Firm*—Oblon, Spivak, McClelland, Maier & Neustadt, P.C.

[57] ABSTRACT

The invention relates to a glazing assembly comprising at least one and in particular two transparent semi-rigid or rigid substrates on which substrate or between which substrates is placed at least one thermally, electrically and/or electrochemically active system which glazing assembly is provided with at least one seal in contact with at least one of the thermally, electrically or electrochemically active materials of the said system. The seal has an electrical conductivity of less than $10^{-4}$ ohm$^{-1}$·cm$^{-1}$ and/or contains compounds which are essentially free of chemical species or functional groups capable of diffusing out of the seal and reacting chemically or electrochemically with at least one of the said materials within the operating voltage and/or temperature range of the system.

15 Claims, 1 Drawing Sheet

GLAZING ASSEMBLY HAVING A THERMALLY, ELECTRICALLY AND/OR ELECTROCHEMICALLY ACTIVE SYSTEM

The invention relates to components, in particular glazing assemblies, which include thermally, electrically and/or electrochemically active systems. By this term is meant systems comprising a material or a number of materials, in particular in the form of a layer or of a stack of layers, having electronic or ionic conduction properties and/or being the site of an electrochemical reversible reaction due to the effect of an electric field and/or being modified due to the effect of heat, of the thermochromic type.

These glazing assemblies may thus be heated windows, with a system having electrically conductive layers (or arrays of conducting wires), glazing assemblies having variable light and/or energy transmission/absorption, such as glazing assemblies with an electrochromic system, or else glazing assemblies having variable light scattering, such as glazing assemblies having an optical-valve system of the particulate-suspension or liquid-crystal system type.

All these systems, which will be denoted herein by "active" systems, have in common the fact that they need means of electrical connection to an external current source which must be designed so as to avoid any short-circuit problem, and/or the fact that they may to a greater or lesser extent be sensitive to external mechanical or chemical attack. This is the reason why these active systems, in order for them to continue operating properly, are usually placed against at least one protective carrier substrate. In general, they are placed between two rigid protective substrates, for example made of glass, either by direct contact or via an adjoining sheet of polymer. Sealing means are furthermore provided for isolating the active systems from the outside. Usually, they are in the form of peripheral polymer seals which form a barrier, in particular a water barrier. It is thus known to use butyl rubber and/or polysulphide, silicone or polyurethane seals.

An electrochromic glazing assembly is thus known, from Patent EP-0,575,207, which, in order to protect the system containing the layers having electrochromic properties, uses a double peripheral seal which includes a first seal based on butyl rubber in contact with the electrochromic system and which acts, in particular, as a sealing barrier with respect to water vapour, and which has a second seal of the silicone, polysulphide or polyurethane type which itself provides sealing with respect to liquid water.

The electrochromic systems of the type described in the aforementioned patent consist of two electronically conductive layers placed on each of the glass substrates, between which layers are the cathodic electrochromic material of the $WO_3$ type, the electrolyte and then optionally a second layer of anodic electrochromic material of the iridium oxide type.

In liquid-crystal systems, there is the same "active" layer configuration, in this case a single layer of polymer with a dispersion of microdroplets containing liquid crystals, this dispersion being placed between two electronically conductive layers. In suspended-particle systems, there is a suspension of acicular and optionally dichroic particles, the suspension itself being dispersed within droplets in a polymer matrix between two electronically conductive layers.

It is therefore necessary, in these various cases, to avoid any accidental direct electrical connection between the two electronically conductive layers. The aforementioned patent EP-0,575,207 has proposed not only a double seal isolating the system from the outside but, in addition, means for ensuring that no current can flow "via" the seal from one conductive layer to the other.

To do this, it provides two alternative or cumulative solutions: the electronically conductive layers are connected to an electric current source, carrying out the procedure, for example, as indicated in Patents EP-408,427, EP-475,847, EP-683,419 and EP-718,667, using current-lead strips deposited by screen printing on their surface along two of their opposed edges. All the screen-printed parts likely to come into contact with the seal or seals are designed so as to be covered beforehand with an electrically insulating enamel. Furthermore, the electronically conductive layers themselves are deposited on their respective substrates in a "margin-leaving" manner, that is to say that each of the layers "stops short" of the edge of the substrate on one of its sides by, for example, at least 1 cm so that, once the two opposed substrates have been assembled, the current-lead strip deposited by screen printing along the marginal edge of one of the electronically conductive layers is not opposite the electronically conductive layer deposited on the other substrate.

Even by taking all these precautions, it has been found that some of these glazing assemblies could exhibit premature aging characteristics, more particularly when the glazing assemblies were used in a configuration that could expose them to large thermal stresses. This is, for example, the case for electrochromic glazing assemblies which, in the coloured state, have a very low light transmission and which are likely to heat up by absorption when they are directly exposed, and for long periods, to solar radiation. One may think, in particular, of electrochromic glazing assemblies used as a car's sunroof, at normal incidence with respect to the sun.

More generally, the "active" systems as defined above are sometimes not sufficiently durable over time, without always being able to identify the reasons for this, or at the very least have a lifetime whose reproducibility has proved difficult to control.

The object of the invention is therefore to remedy these drawbacks, in particular by finding means for controlling the durability of such glazing assemblies having "active" systems, for the purpose of improving the durability and/or of better controlling its reproducibility, especially means which do not throw into question the current methods of manufacturing these glazing assemblies and preferably which are able to move towards simplifying them.

The subject of the invention is a glazing assembly comprising at least one and in particular two transparent semi-rigid or rigid substrates, on which substrate or between which substrates is deposited at least one thermally, electrically and/or electrochemically active system, which glazing assembly is provided with at least one seal in contact with at least one of the electrically or electrochemically active materials of the system. This seal, depending in particular on the type of active system envisaged, has two alternative or cumulative technical characteristics: it has an electrical conductivity at least less than $10^{-4}$ $ohm^{-1} \cdot cm^{-1}$, in particular less than $10^{-5}$ $ohm^{-1} \cdot cm^{-1}$, and even less than $10^{-7}$ $ohm^{-1} \cdot cm^{-1}$ or $10^{-9}$ $ohm^{-1} \cdot cm^{-1}$, and/or it contains compounds essentially free of chemical species or functional groups likely to diffuse out of the seal and either to react, chemically or electrochemically, with at least one of the active materials of the system within its operating voltage and/or temperature range or to "contaminate" one of these materials.

By "semi-rigid or rigid substrates" is meant substrates which may, in particular, be based on glass or on a polymer or polymers of the polyethylene terephthalate PET, polymethyl methacrylate PMMA or polycarbonate PC type.

By "contaminate" is meant acting in a way which does not necessarily involve a chemical reaction or modification of one or other of the constituents of the system but which does impair its mode of operation.

The chemical or electrochemical reactions, or these contaminations, may be "direct" or "indirect" in that the compounds which cause them come from the seal directly or else are in fact by-products of compounds coming from the seal and which then act "indirectly".

Included in the invention is active glazing assemblies in which the active system consisting of a stack of different layers is directly combined with at least one semi-rigid or rigid substrate. This is, for example, the case for electrochromic glazing assemblies in which there is the usual glass/active system or glass/active system/glass structure. However, the invention also comprises active systems combined or intended to be combined with at least one semi-rigid or rigid substrate by means of at least one sheet of polymer-based material. For example, liquid-crystal systems in which there is often the glass/polymer(s)/active system/polymer(s)/glass structure are thus included. In the case of the product currently sold by SAINT-GOBAIN VITRAGE under the name "Priva-Lite", there is therefore the glass/PVB/PET/liquid-crystal system/PET/PVB/glass structure, the (PET/liquid-crystal system/PET) film being laminated to the glass panes by the two thermoplastic sheets of PVB, the PET (polyethylene terephthalate) polymer being a flexible polymer. (The sheets of PVB may be replaced by sheets of polyurethane).

By "electrically or electrochemically active materials" is meant, in the sense of the invention, not only the materials included in the system but also all the materials which make it possible, in particular, to supply it with electricity, and especially all those usually denoted by the term connection elements (current-lead strips, shims, etc.).

By "thermally" active is meant materials of the thermochromic type which are capable of being reversibly modified above a certain temperature, in particular by a reversible phase change making them opaque/reflective at high temperature. For further details, the reader may refer, for example, to Patents EP-0,639,450 and WO-93/02380.

The authors of the invention have in fact studied the aging phenomena in active glazing assemblies, more particularly in electrochromic glazing assemblies, which phenomena sometimes occur prematurely, in particular when the glazing assemblies must be repeatedly subjected to heating up to more than 80° C., a temperature which may actually be encountered when the glazing assemblies are maintained in the coloured state, therefore when they are absorbent, in full sunlight.

These aging characteristics may consist of the appearance of bubbles visible to the naked eye when, for example, an electrolyte in the form of an ionically conductive polymer is used and/or the appearance of colour inhomogeneities between the edges and the central part of the glazing assembly.

Initially, it was suspected that these defects stemmed from "spurious" electrochemical reactions connected with the very nature of the materials used in the system. In fact, it has surprisingly turned out that it was possible to eliminate most of these defects without having to modify radically the nature or the arrangement of the materials involved in the composition of the "active" system, but merely by adapting and controlling the chemical composition and/or the electrical properties of the seal: by choosing a seal which is essentially an insulator from an electrical standpoint, there is no risk of one electronically conductive layer being short-circuited to the other by the seal. This is because it has been found that the usual seals, for example those based on the already-mentioned butyl rubber, exhibited a certain degree of electrical conductivity which, although small, could by itself justify the need, as mentioned previously, to cover the current leads with insulating enamel and/or to "leave a suitable margin" around the electronically conductive layers. If an electrically insulating seal is used, it is conceivable to ignore these two precautions, this being a not insignificant advantage from an industrial standpoint insofar as this simplifies the manufacture of the glazing assemblies and shortens their production cycle times.

Selecting the chemical nature of the seal so that it contains no or virtually no compounds likely to diffuse into the electrochemically active materials of the system and to react in contact with them makes it possible, moreover, to be sure that there are no spurious electrochemical reactions which are concurrent with those that are desired to be instigated and which will degrade the performance characteristics of the system in an irreversible manner.

The seal according to the invention is also highly advantageous for liquid-crystal active glazing assemblies. This is because the seal does not contain compounds likely to diffuse out of it and "contaminate" the active layer. In this case, it is not a question of actually avoiding deterioration by a spurious electrical or electrochemical reaction, but it has been observed that if the joint were to contain "impurities" capable of diffusing right into the microdroplets containing the liquid crystals, these impurities could render the liquid-crystal phase isotropic, irreversibly, thereby stopping the operation of the glazing assembly locally.

A preferred embodiment of the seal according to the invention consists in choosing it so that it contains very few or no conductive particles and/or very few or no chemical functional groups of the unsaturated-bond type, such as C=O or C=N bonds, of the aromatic type, such as all phenol derivatives, or of the type having a bond with sulphur, such as thiols SH.

In fact, these residual reactive functional groups likely to diffuse may be intrinsic or "extrinsic" to the polymer material which is the essential component of the seal, in the sense that they may belong to the polymer chains, or be contained in the various additives and impurities which the seal moreover contains, coming, for example, from plasticizers, fillers, if there are any, residues of the catalyst used to synthesize the polymer, etc.

According to the invention, and depending on the "sensitivity" of the active glazing assembly with respect to a given reactive functional group, it is therefore important to be vigilant with regard to the nature of the polymer of the seal and the formulation of the latter: the invention resides in the fact of being able to produce a seal whose chemical formulation is suitable and maintained constant, so that the glazing assembly itself can, in its entirety, have a constant lifetime, independent of the seal.

The "active" glazing assemblies in the sense of the invention, which may advantageously be equipped with such a type of seal, are, for example, heated windows with a system of the type having an array of conducting wires or a continuous conductive layer, made of metal or doped metal oxide. In this case, the most important property that the seal according to the invention must have is its electrical insulatability. A glazing assembly of this type is used in particular in a laminated structure of the glass/heating system/thermoplastic adjoining sheet/glass type in vehicles, for example as a windscreen. For more details, the reader may advantageously refer to Patents EP-433,136, EP-353,140 and EP-353,141. The seal may then be advantageously deposited using an extrusion technique adapted to the deposition of seals for fitting laminated glazing assemblies, which technique is described in particular in Patents EP-121,479, EP-121,480, EP-121,481 and EP-620,134.

These may also be active glazing assemblies of the thermochromic type, as explained above.

"Active" glazing assemblies in the sense of the invention also include glazing assemblies exhibiting variable light and/or energy transmission/absorption of the electrochromic-system type. The mode of operation thereof is briefly recalled below: these comprise, in a known manner, a layer of an electrochromic material capable of reversibly and simultaneously inserting cations and electrons and the oxidation states of which, corresponding to the inserted and disinserted states, are of different colour, one of the states exhibiting a higher light transmission than the other. The insertion or disinsertion reaction is driven by a suitable electric supply using a current generator or a voltage generator. The electrochromic material, usually based on tungsten oxide, must then be placed in contact with a source of electrons, such as a transparent electronically conductive layer and a source of cations, such as an ionically conductive electrolyte.

Furthermore, it is known that, to ensure at least about a hundred switchings, the layer of electrochromic material must be combined with a counterelectrode, itself also capable of reversibly inserting cations, symmetrically in relation to the layer of electrochromic material, so that, macroscopically, the electrolyte appears to be a simple medium for the cations.

The counterelectrode must consist either of a layer which is neutral in colour, or at least transparent or weakly coloured, when the electrochromic layer is in the colour-faded state. Since tungsten oxide is a cathodic electrochromic material, that is to say its coloured state corresponds to the most reduced state, an anodic electrochromic material such as nickel oxide or iridium oxide is generally used for the counterelectrode. It has also been proposed to use a material which is optically neutral in the oxidation states involved, such as, for example, cerium oxide or organic materials like electronically conductive polymers (polyaniline, etc.) or Prussian blue.

The description of such systems will be found, for example, in European Patents EP-0,338,876, EP-0,408,427, EP-0,575,207 and EP-0,628,849.

At the present time, these systems can be classified into two categories, depending on the electrolyte type which they use:

either the electrolyte is in the form of a polymer or of a gel, for example a proton-conducting polymer, like those described in European Patents EP-0,253,713 and EP-0,670,346, or a polymer exhibiting lithium ion conduction, such as those described in Patents EP-0,382,623, EP-0,518,754 or EP-0,532,408;

or the electrolyte is an ionically conductive but electronically insulating inorganic layer—the term "all-solid" electrochromic systems is then employed. For the description of an "all-solid" electrochromic system, the reader may refer to the French patent application filed on Mar. 27, 1996 under the filing number FR-96/03799.

The seal according to the invention is particularly advantageous for electrochromic glazing assemblies in which the electrolyte is in the form of a polymer or of a gel, the thickness of which is much greater than that of electrolytes in the form of an inorganic layer and the essentially organic nature of which makes them more vulnerable to degradation by coming into contact with reactive species diffusing from the seal. However, it is also beneficial to use it for "all-solid" systems. In whatever configuration, it is important that the seal intended to equip these electrochromic glazing assemblies be free of species likely to undergo oxidation-reduction reactions within the voltage range for operating the glazing assemblies: advantageously, the seal is composed of species whose redox potential does not lie within this voltage range.

As another type of glazing assembly having variable light or energy transmission/absorption which can be equipped with the seal according to the invention, there are also so-called viologenic glazing assemblies such as those described in U.S. Pat. No. 5,239,406 or in Patent EP-0,612,826.

The invention also applies to glazing assemblies having systems with variable light scattering and/or absorption, in particular of the so-called optical valve type: what is involved here is a film comprising a generally crosslinked polymer matrix in which are dispersed microdroplets containing particles which have the property of being oriented in a preferred direction under the effect of an electric or magnetic field.

The film exhibits optical properties which vary depending, in particular, on the potential applied across the terminals of the conductive layers placed on each side of the film, and on the concentration and nature of the orientable particles. Thus, Patent WO-93/09460 discloses an optical valve based on a film comprising a matrix of crosslinkable polyorganosilane and inorganic or organic orientable particles, more particularly light-absorbing particles such as polyiodide particles. When a voltage is applied to the film, the chemical particles intercept the light much less than when there is no voltage.

Also included as glazing assemblies with optical light scattering are liquid-crystal glazing assemblies. They are based on the use of a film placed between two conductive layers, the film being based on a polymeric material in which are dispersed droplets of liquid crystals, in particular nematic liquid crystals with positive dielectric anisotropy. When voltage is applied to the film, the liquid crystals are oriented along a preferred axis, which allows an observer to see through it. With no voltage applied, in the absence of alignment of the crystals, the film becomes scattering and prevents an observer from seeing through it.

Examples of such films are described in particular in European Patent EP-0,238,164 and U.S. Pat. Nos. 4,435,047, 4,806,922 and 4,732,456. A film of this type, once laminated and incorporated between two glass substrates is sold by the company SAINT-GOBAIN VITRAGE under the trade name "Priva-Lite".

All the liquid-crystal devices known under the names "NCAP" (Nematic Curvilinearly Aligned Phase) or "PDLC" (Polymer-Dispersed Liquid Crystal) crystals can in fact be used.

It is also possible to use, for example, gels based on cholesteric or nematic liquid crystals, like those described in Patent WO-92/19695, or else liquid-crystal polymers.

The invention also applies to active systems of the photovoltaic system type, which are most often in the form of two glass-type rigid substrates between which is placed a stack comprising a layer of $TiO_2$ having photocatalytic properties, a layer of electrolyte and an electronically conductive layer.

The preferred joint according to the invention comprises a polymer matrix based on a thermosetting or thermoplastic polymer. It may be partly or completely crosslinked, in particular using crosslinking agents of the isocyanate or epoxy type. Preferably, it is a polymer based on an elastomer or elastomers. The reason for this is that the latter type of polymer is advantageous in the sense that it has glass transition temperatures which are markedly below the ordinary temperature of use, that its properties allow it to be incorporated into the active glazing assembly using well-controlled automated techniques, such as the technique of extrusion already mentioned, and that it exhibits good adhesion to substrates, in particular glass substrates.

The preferred elastomers within the scope of the invention are selected from essentially saturated hydrocarbon polymers (hydrocarbon polymers, silicones), preferably selected from monoolefin-based polymers such as isobutylene or ethylene-propylene, or polyolefins catalysed by metallocene catalysts, in particular of the polyethylene type.

Polyolefins, of the polyethylene, ethylene-propylene copolymer, ethylene-propylene-butene copolymer, polymethylpentene, propylene, isobutylene-isoprene, ethylene-vinyl acetate EVA or ethylene-vinyl butyrate EVB type, may also be used. It is also possible to use polymers of the polyurethane family or, as mentioned above, of the silicone family, more particularly those having the group:

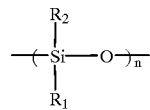

where $R_1$ and $R_2$ may be, in particular, halogens of the chlorine type, hydrocarbon radicals of the saturated type, such as a methyl or ethyl group, or of the aromatic type, such as a phenol, or finally a hydrogen.

It is advantageous for the polymer matrix to consist not of a single polymer of the elastomer type, but of a number of them, in particular at least three, having different molar masses. Preferably, these are selected from a range of molar masses of at least $2 \times 10^4$, for example lying between $3 \times 10^4$ and $2 \times 10^6$. It is thus possible to make a blend of at least three polymers, one having a molar mass of between $3 \times 10^4$ and $8 \times 10^4$, the second between $2 \times 10^5$ and $1 \times 10^6$ and the third above $1 \times 10^6$. The combination of several elastomers of different molar masses allows precise adjustment of the mechanical properties and the viscosity of the seal, in particular depending on its use in the glazing assembly: thus, when it is incorporated with an electrochromic glazing assembly, using the type of process indicated in Patent EP-B-477,065, i.e. when it is deposited around the periphery of one of the substrates of the glazing assembly intended to be joined to another substrate using a hot-calendering technique, the seal then acting as a temporary spacer, it is necessary for the seal to be able to exhibit good mechanical strength and sufficient rigidity up to temperatures as high as 80° C. but it must, on the other hand, be capable of flowing during calendering, i.e. at temperatures of about 110° C. to 120° C.

The polymer matrix of the joint also preferably contains at least one plasticizer which will also help to adjust the flexibility of the seal depending on the requirements. Preferably, the plasticizer has a low molar mass, in particular less than or equal to 20,000 or even less than or equal to 10,000. In exactly the same way as with the previous elastomers, it is preferable that it be free of chemical species likely to react with one or other of the materials of the active system, hence the selection of preferred polymers having few or no polar and saturated functional groups, such as saturated hydrocarbons optionally having ester or acrylate functional groups. This is because the low polarity or non-polarity of the plasticizer is an advantage in order to minimize any chemical affinity which the plasticizer could have for the materials, at least in respect of the organic part, which the active systems may contain. Thus, it is important that it is not very polar if it has to come into contact with highly polar liquid crystals of a liquid-crystal system, or with an electrolyte based on an $H^+$ or $Li^+$ conductive polymer of the type used in electrochromic glazing assemblies. This preferred choice of a contrary polarity, or at least one which is significantly different from that of the organic material of the active system, may of course also apply to all the other organic compounds in the seal.

These may thus be polyisobutylene of low molar mass, phthalate derivatives such as diisodecylphthalate, adipate, sebacate or sulphonate derivatives, or else paraffinic oils of the high-purity white paraffinic oil type, such as the oil sold under the name "Primol" by the company British Petroleum.

The polymer matrix of the seal may also contain an adhesion promoter. By adhesion promoter is meant a compound capable of promoting the adhesive effect of the matrix, sometimes known by the name tackifier resin. In particular, it has a very low molar mass, of less than or equal to 10,000, in particular less than 5,000 and lying between 2,000 and 500 and/or a softening point of between 50 and 130° C., in particular between 90 and 110° C. It is preferable to select it from those of the saturated hydrocarbon aliphatic resin type.

The seal according to the invention may also contain, dispersed within the polymer matrix, at least one filler, in particular one selected so as to be not electrically conductive or barely electrically conductive, preferably inorganic and in the form of a powder. The presence of filler in the matrix may help to give it the desired mechanical strength. However, a filler is optional and its absence may as it were be "compensated for" by adjusting the distribution of elastomers of various molar masses in the matrix, in particular by increasing the content of high-molar-mass elastomers.

As type of filler, it is preferable to select materials which are insulating from an electrical standpoint, for example of the metal-oxide type, such as aluminium oxide or magnesium oxide, of the sand type, such as silica sand, quartz sand, diatomaceous earth, thermal silica, also called pyrogenic silica, or else non-pyrogenic silica. They may also be silicates, such as talc, mica or kaolin, glass microspheres or balls, or else other inorganic powders, such as calcium carbonate. On the other hand, it is preferable to avoid the use of fillers which are electrically conductive and/or likely to contain impurities which can react electrochemically with at least one of the materials of the active system. Thus, fillers of the carbon black particle type, although a filler normally used to reinforce butyl rubbers, are to be avoided, or at the very least to be suitably chosen, in particular with regard to their origin and the amount chosen.

In fact, provision may be made to incorporate a certain amount of particles of the carbon black type, but a limited amount for at least two reasons: on the one hand, the particles are relatively electrically conductive albeit only slightly. On the other hand, the method of synthesis of particles of this type may mean that they may contain a certain residual level of impurities which may prove to be chemically "active" and therefore which, within the context of the invention, are problematic, for example those which have a sulphur-containing functional group and/or are unsaturated or aromatic. It is therefore desirable, if they are used in the seal, to limit their amount by weight to at most 15%, in particular at most 5 to 10%.

The chosen fillers may also be in the form of fibres, in particular inorganic fibres of the glass or rock type, either fibres of the type used in insulation materials, in particular those sold by the company ISOVER SAINT-GOBAIN, or glass fibres of the textile type which can act as a mechanical reinforcement, in particular of the type of those sold by the company VETROTEX SAINT-GOBAIN.

It is also possible to use non-inorganic fillers, in particular those in the form of polymer balls made, for example, of polyamide, polymethyl methacrylate PMMA, such as Lucite®.

Other additives may also be added to the formulation in order to provide additional functionality. Thus, it may be beneficial to add antioxidant additives, depending on the end-uses of the glazing assembly. It is preferable to avoid using antioxidants such as BHT or di-tert-butylphenol which is capable of undergoing oxidation-reduction reactions within the voltage range of normal operation of electrochromic glazing assemblies. It is better, for example, to use other types of antioxidants whose redox potential does not lie within the voltage range for operating electrochromic glazing assemblies. These may, more particularly, be sterically hindered amines or triphenylphosphine TPP.

According to a preferred variant of the invention, the seal may thus have a formulation comprising, in weight percentages, from 20 to 90% of elastomer(s), from 15 to 30% of plasticizer(s), from 0 to 25% of adhesion promoter (s) and from 0 to 30% of filler(s).

Moreover, provision may be made to crosslink the polymer matrix of the seal, for example using a crosslinking agent of the isocyanate and/or epoxy type. It is then preferable to adjust the amount of crosslinking agent(s) so as to ensure its (their) total conversion within the polymer, since these are chemically reactive compounds.

Likewise, it is preferable to manufacture the polymer matrix so that it has a residual content as close as possible to 0% by weight of the initial monomers, again so as to avoid the situation whereby the seal, once manufacture has been completed, contains a significant amount of low-mass compounds which are capable of diffusing and are chemically highly reactive.

Advantageously, if this proves necessary, the seal described above may be combined with at least one other seal which is "complementary" in the sense that it complements its sealing function, in particular with regard to liquid water. Thus, this may be a second seal of the polysulphide, polyurethane or silicone type which may be placed against the first seal by coating the latter, in a known manner, or by coextrusion and/or simultaneous extrusions of the two seals.

The invention applies in particular to a glazing assembly having a laminated structure comprising three rigid substrates of the glass type, in which there is, between the first substrate and the second substrate, an adjoining sandwich sheet made of thermoplastic polymer of the polyvinyl butyral PVB or ethylene-vinyl acetate EVA copolymer type or else of certain polyurethanes and, between the second substrate and the third substrate, an electrochromic system, the relative dimensions of the three substrates being such that the glazing assembly has a peripheral groove in which the seal(s) is (are) placed so as to be flush with or stand proud of the edges of the glazing assembly.

Next, the laminated structure may be mounted as a multiple insulating glazing assembly, in particular as double glazing, by joining it to another rigid substrate via an intermediate gas-filled cavity.

The invention may also consist in mounting the active glazing assembly as an "asymmetric" laminated glazing assembly, in which one of the two rigid substrates surrounding the electrochromic-type active system is provided, on its face turned towards the outside, with at least one sheet of polymer having energy-absorption properties, the said sheet being optionally combined with a second sheet of polymer having "self-healing" properties, the polymers selected being usually those based on polyurethane. For more details with regard to this type of structure, the reader may refer, for example, to Patents EP-132,198, EP-131,523 and EP-389, 354.

As mentioned above, the seal according to the invention is preferably incorporated into the active glazing assembly using an extrusion technique, which has the advantage of not requiring a prior preforming step and of allowing continuous deposition of the seal.

The subject of the invention is also the seal itself, as defined above.

Further details and advantageous characteristics of the invention will emerge from the description below of a preferred and non-limiting embodiment, with reference to the appended drawing.

Figure 1:
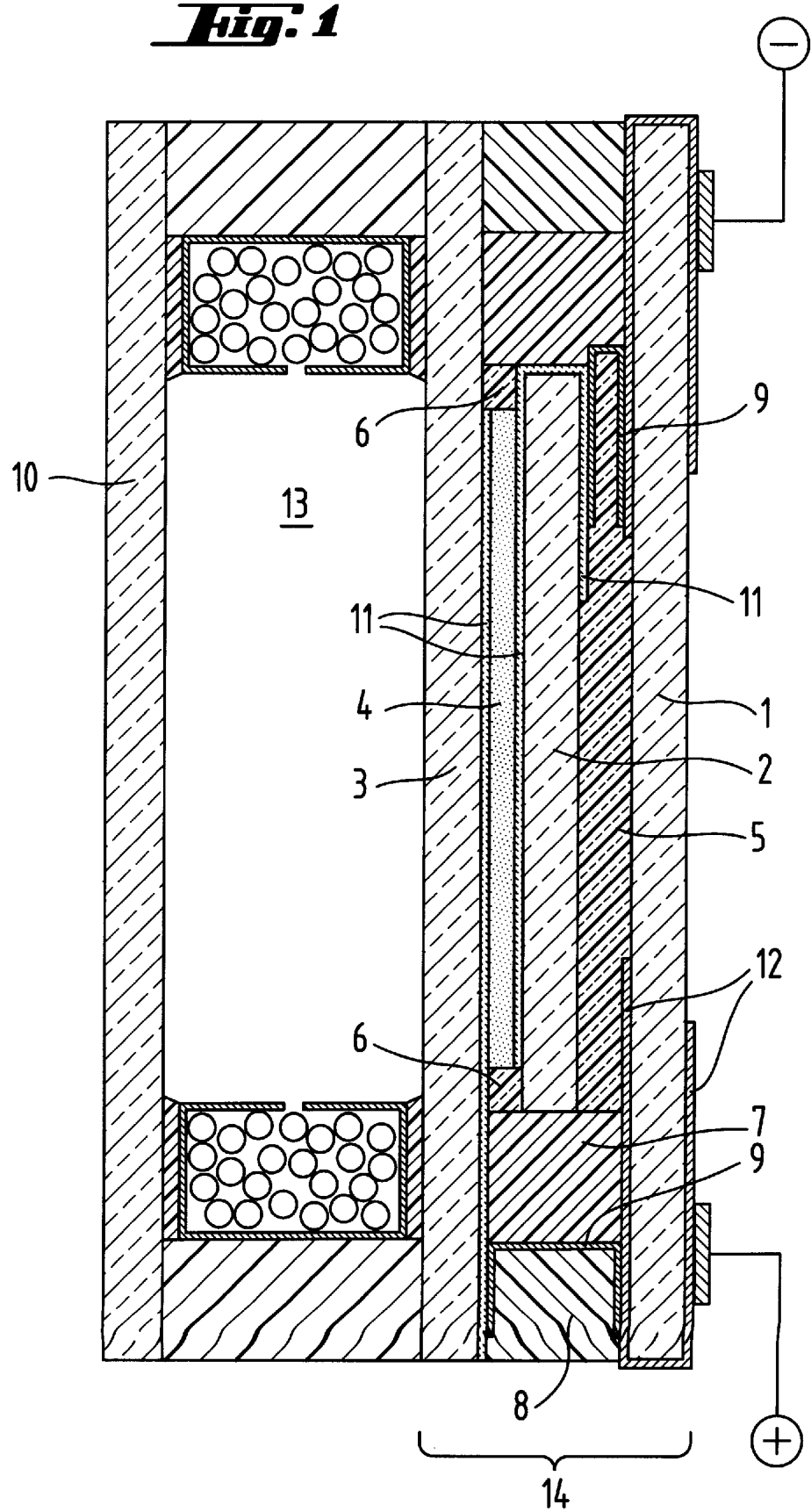
FIG. 1 is a laminated electrochromic glazing assembly mounted as double glazing.

Before describing the electrochromic glazing assembly and the configuration of the seal which seals the stack of layers of the electrochromic system, the formulation of three seals according to the invention will firstly be described. It should be pointed out that the operation of mixing the various constituents of the seals is carried out hot, in a standard Z-blade mixer, so as to lower the viscosity of the constituents and to promote homogeneity of the mixture.

The base constituents of the seals exemplified below are as follows (it should be pointed out that the "molar masses" are to be taken as the viscosity average of the molecular weight, determined from the viscosity of the polymer in isooctane at 20° C. A Ubbelohde viscometer with a No. 1 capillary is used for the measurement:

A—elastomer polymers having a variable molar mass:

A1: a polyisobutylene having a molar mass of from 1.3 to $1.8 \times 10^6$, sold under the name Oppanol 120 by the company BASF;

A2: a polyisobutylene having a molar mass of from 0.62 to $0.96 \times 10^6$, sold under the name Oppanol 80 by the company BASF;

A3: a polyisobutylene having a molar mass of 85,000, sold under the name Oppanol 15 by the company BASF;

A4: a polyisobutylene having a molar mass of 40,000 sold under the name Oppanol 10 by the company BASF;

B—a plasticizer, which here is a polyisobutylene having a molar mass of 2,600 sold under the name Hyvis 200 by the company Technigram;

C—an adhesion promoter, which is a hydrogenated hydrocarbon aliphatic resin, i.e. a saturated resin, having a softening point of between 96 and 104° C. sold under the name Escorez 1304 by the company Exxon Chemical; and D—an inorganic filler in the form of a kaolin powder.

Table 1 below gives the formulation of three seals according to the invention, numbered 1 to 3, giving the contents, in weight percent, of the various constituents listed above:

TABLE 1

|    | Seal No. 1 | Seal No. 2 | Seal No. 3 |
|----|------------|------------|------------|
| A1 | —          | 20         | —          |
| A2 | 22.9       | 10         | 11.8       |
| A3 | 15.2       | 20         | 11.8       |
| A4 | 22.9       | 30         | 5.9        |
| B  | 15.2       | 20         | 11.8       |
| C  | 19.1       | —          | 17.6       |
| D  | 4.7        | —          | 41.7       |

These three types of seal were then subjected to a test intended to evaluate their mechanical properties at various temperatures. It consists in measuring their elastic moduli $G^+$, $G'$ and loss moduli $G''$ at two temperatures, one around 80° C., for which these moduli must be quite high in order to avoid creep (when the active glazing assembly has been fitted), and the other around 130° C., for which these moduli must be high enough to allow the processing and desired flow of the seal during the manufacture of the glazing assembly.

The operating mode of this test is as follows: the moduli are measured in torsion on a disc 10 mm in diameter, cut from a film 1 mm in thickness obtained by pressing the material at 120° C. The specimen is tested using a rheometer, placing a specimen between two parallel plates 5 mm in radius, and a constant normal force of 0.2 N is applied to the upper plate.

A sinusoidal strain ($\gamma$) is imposed on the upper plate at a frequency of 1 Hz, and the sinusoidal stress ($\tau$) necessary and the phase angle ($\phi$) between the stress and the strain are measured while the specimen is being heated from 33° C. to 180° C. at a rate of 5° C./min.

The various moduli are obtained as follows:

$$G^* = \tau/\lambda$$
$$G' = G^* \cos\phi$$
$$G'' = F^* \sin\phi$$

Table 2 below gives, for each of the seals, the values of $G^+$ in pascals together with the phase angle in degrees, at 80 and 120° C.:

TABLE 2

|            | T = 80° C.        |      | T = 120° C.       |      |
|------------|-------------------|------|-------------------|------|
|            | G                 | $\phi$ | G                 | $\phi$ |
| Seal No. 1 | $3.3 \times 10^4$ | 29.8 | $2.3 \times 10^4$ | 31.1 |
| Seal No. 2 | $3.9 \times 10^4$ | 25.9 | $2.6 \times 10^4$ | 26.8 |
| Seal No. 3 | $7.8 \times 10^4$ | 33.6 | $5.3 \times 10^4$ | 36.4 |

Table 3 below gives, for Seal No. 3, the values of $G'$ and $G''$, together with their phase angle, again at 80 and 120° C.:

TABLE 3

|            | T = 80° C. | | | | T = 120° C. | | | |
|------------|------|------|------|------|------|------|------|------|
|            | $G'$ | $\phi$ | $G''$ | $\phi$ | $G'$ | $\phi$ | $G''$ | $\phi$ |
| Seal No. 3 | $6.38 \times 10^4$ | 32.99 | $4.14 \times 10^4$ | 32.99 | $4.30 \times 10^4$ | 35.47 | $3.07 \times 10^4$ | 35.47 |

The values given in Tables 1 to 3 make it possible to verify the compatibility of the formulation of these three seals with their intended application: they are sufficiently ductile at 120° C. and sufficiently rigid at 80° C.

These three seals have been successfully used in laminated electrochromic glazing structures, of which only those characteristics relevant to the invention will be referred to here. For more details, the reader may refer, for example, to the aforementioned Patent EP-0,575,207.

In addition, the electrical conductivity $\sigma$ of three types of seal according to the invention was measured:

☐1—Seal No. 3, the formulation of which is indicated in Table 1;

☐2—Seal No. 3a, the formulation of which is identical to Seal No. 3 but which furthermore contains 5% by weight of carbon black particles, referenced Statex N550 and supplied by the company Colombian (the contents, in percentages by weight, of the other constituents being modified accordingly);

☐3—Seal No. 3b, the formulation of which is identical to Seal No. 3 but which furthermore contains 10% by weight of carbon black particles identical to those used in Seal No. 3a (the contents, in percentages by weight, of the other constituents also being required to be modified accordingly).

The results are indicated in Table 4 below:

TABLE 4

|             | $\sigma(\text{ohm}^{-1} \times \text{cm}^{-1})$ |
|-------------|-----------|
| Seal No. 3  | $<10^{-11}$ |
| Seal No. 3a | $10^{-11}$  |
| Seal No. 3b | $10^{-8}$   |

The conductivity of Seal No. 3 is too low to be able to be accurately determined.

It may be seen from these results that even a non-negligible amount, of 10 by weight, of relatively electrically conductive particles leads to a seal which remains generally not very conductive: if the applications of a seal so require, it is possible to obtain an extremely electrically insulating seal by using any conductive filler. If such a level of insulation is not required, it is therefore possible to add a certain amount of conductive particles of the carbon black type which, moreover, are beneficial as mechanical reinforcement.

Another series of three seals according to the invention was manufactured:

☐Seal No. 4:
It comprises:
2 types of polymers:
  ⇒ 280 g of an ethylene/propylene copolymer sold by Eastman Chemicals under the name "Eastoflex E1003",
  ⇒ 420 g of butyl rubber having a residual content of unsaturated functional groups of 2% by weight, sold by Eastman Chemicals under the name "Kalar 5214 butyl rubber";

500 g of inorganic filler in the form of sodium carbonate;

700 g of an adhesion promoter sold by Eastman Chemicals under the name "Eastotac H-130L";

100 g of a plasticizer, made of low molecular-weight polyisobutylene, sold by Eastman Chemicals under the name "Indopol H-1900".

☐Seal No. 5:

It comprises:

as polymers:
- → 420 g of butyl rubber of Seal No. 4,
- → 280 g of polyisobutylene sold by Eastman Chemicals under the name "Vistanex LM-MS";

500 g of filler in the form of calcium carbonate;

700 g of the adhesion promoter of Seal No. 4;

100 g of the plasticizer of Seal No. 4.

☐Seal No. 6:

It comprises, in percentage by weight:

a combination of polymers:
- →38% of an ethylene-propylene-butene copolymer sold by Hüls under the name "Vestoplast 703",
- →15% of a copolymer of the same type, sold under the name "Vestoplast 750",
- →1.5% of a styrene/ethylene-butylene/styrene triblock copolymer sold by Huls under the name "Kraton G1657",
- →30% of polyisobutylene sold under the name "Oppanol B15",
- →7.5 of butyl rubber having a residual content of unsaturated functional groups of at most 2 or 3% by weight, sold by Hüls under the name "Butyl rubber PB 402-24", 7.5% by weight of an adhesion promoter sold by Hüls under the name "Beuilite 62-107", 1% by weight of filler in the form of carbon black sold under the name "Carbon Black Printex 60".

These three seals are electrically insulating and they confirm that it is possible to use, at least in part, a polymer of the butyl rubber type having, however, a certain content of unsaturated functional groups: if the content remains, for example, generally less than 5 to 10% by weight of the seal, this does not, a priori, cause a problem of deleterious chemical reactivity with one of the materials of the active system in question.

FIG. 1 shows diagrammatically such an electrochromic glazing assembly having a laminated structure, mounted as double glazing: it includes a glass substrate 1 joined to a second glass substrate 2 via an adjoining sandwich sheet 5 of PVB. Between this substrate 2 and the substrate 3 is the electrochromic system 4, i.e. a first electronically conductive layer of a tin-doped indium oxide ITO or a fluorine-doped tin oxide F:SnO$_2$, then a cathodic electrochromic layer such as WO$_3$, and then a layer of electrolyte made of protonically conductive polymeric material such as a solution of H$_3$PO$_4$ in polyoxyethylene POE. (It may also be an electrochromic glazing assembly operating by the reversible insertion of Li$^+$ ions, with a lithium-conducting polymeric material of the polyethyleneimine/lithium salt type).

Deposited on the electrolyte is a layer of anodic electrochromic material made of hydrated iridium or nickel oxide and then an electronically conductive layer of the ITO or F:SnO$_2$ type.

The glass 1/glass 2/glass 3 assembly is then mounted, optionally, as double glazing, using a glass 10 via a gas-filled cavity 13. For more details about such a structure, and in particular the entire connection system, the reader should advantageously refer to Patent EP-0,575,207: it uses metal shims 9 and screen-printed conducting strips 11, 12 allowing electrical supply via the external face of the glass substrate 1.

Of course, it is also possible to use the glazing assembly comprising only the glasses 1, 2, 3, as the laminated glazing assembly 14, or even only glasses 2 and 3. (In the latter configuration, the glasses 2 and 3 are preferably chosen so as to be the same size).

In the more complex case shown in FIG. 1, the seal according to the invention is the seal 6. Other seals 7, 8 are added to it when mounting the twin-glass 2, 3 structure with the glass 1 by laminating with the PVB sheet 5, these seals being polysulphide-based seals.

The three seals 6, Nos 1, 2 and 3 according to the invention were satisfactory and made it possible to increase very considerably the lifetime of the glazing assembly compared to standard seals based on butyl rubber, the best results being obtained with seal No. 3.

It should be pointed out that seal No. 2, which also gives useful results, is free of fillers but does include a polyisobutylene Al of very high molar mass, which replaces or compensates for the mechanical reinforcement role played by the inorganic fillers.

In conclusion, the invention has developed particularly advantageous novel compositions of seals to be used for glazing assemblies provided with materials which are quite sensitive to degradation, such as electronically conductive and ionically conductive materials, materials which are the site of reversible chemical/electrochemical reactions or materials which change phase with temperature, of the thermochromic type.

The advantage of these seals is that they fulfil their sealing function effectively, but that, furthermore, their electrical insulation property and/or their great chemical inertness make it possible for them in no way to "interfere" with these materials, hence giving greater durability of this type of glazing assembly and, above all, greater reproducibility in their lifetime, Moreover, the choice of the constituents of the seal advantageously makes it possible to vary its mechanical properties, its cold viscosity and its hot viscosity, which allows simple and automated processing, for example by extrusion, so as to fit in easily with the manufacture of any type of active glazing assembly: in the case of electrochromic glazing assemblies, it may be that the electrolyte employed is an "all-solid" or a polymer-based electrolyte and, in the latter case, that the electrolyte is deposited in the form of a film or by a casting technique.

The priority documents of the present application, French Patent Application Nos. FR96/12655 and FR96/15631, filed on Oct. 17 and Dec. 19, 1996, respectively, are hereby incorporated by reference.

We claim:

1. A glazing assembly comprising at least one transparent semi-rigid or rigid substrate, at least one thermally, electrically and/or electrochemically active system on said substrate, and at least one seal in contact with said active system, wherein said seal contains compounds which are essentially free of chemical species or functional groups which diffuse out of said seal and react with materials of said active system, under the operating conditions of said active system, or to said materials;

wherein said seal comprises a polymer matrix based on thermoplastic or thermosetting polymer(s); and wherein said seal comprises, in weight percentages, from 20 to 85% by weight of elastomer(s) (A); from 15 to 30% of plasticizer(s) (B); from 0 to 25% of adhesion promoter(s) (C) and from 0 to 30% of filler(s) (D).

2. A glazing assembly according to claim 1, wherein said seal has an electrical conductivity of less than $10^{-4}$ ohm$^{-1}$·cm$^{-1}$.

3. A glazing assembly according to claim 1 wherein said seal contains very few or no conductive or semiconductive particles and/or very few or no chemical functional groups containing unsaturated bonds, aromatic bonds or sulphur.

4. A glazing assembly according to claim 1 wherein said active system is a heating system having an array of conducting wires or a continuous conductive layer made of metal or doped metal oxide, or a system having variable light or energy transmission/absorption of an electrochromic-system or viologenic system, or a system with variable light scattering of the suspended-particle or liquid-crystal optical-valve system, or a photovoltaic system.

5. A glazing assembly according to claim 1, wherein said polymer matrix contains a plurality of elastomers (A) each having different molar mass.

6. A glazing assembly according to claim 1 wherein said polymer matrix contains at least one plasticizer (B), of molar mass less than or equal to 20,000.

7. A glazing assembly according to claim 1 wherein said polymer matrix contains at least one adhesion promoter (C).

8. A glazing assembly according to claim 1 wherein said seal also contains, dispersed within the polymer matrix, at least one filler (D).

9. A glazing assembly according to claim 1 further comprising a second seal in contact with said active system.

10. A glazing assembly according to claim 1 comprising first, second and third rigid substrates, between the first substrate and the second substrate, a thermoplastic adjoining sandwich sheet comprising polyvinyl butyral or ethylene-vinyl acetate and, between the second substrate and the third substrate, an electrochromic system, the respective dimensions of the three substrates being such that the glazing assembly has a peripheral groove in which said at least one seal is placed.

11. A glazing assembly according to claim 10, wherein said first, second and third rigid substrates form a laminated structure which is mounted as a multiple insulating glazing assembly by joining it to a fourth rigid substrate via an intermediate gas-filled cavity.

12. A glazing assembly according to claim 1, wherein said seal has an electrical conductivity of less than $10^{-5}$ $ohm^{-1} \cdot cm^{-1}$.

13. A glazing assembly according to claim 1, wherein said seal comprises a polymer matrix based on an elastomer or elastomers (A) selected from the group consisting of monolefins, polyolefins, ethylene-vinyl acetate, ethylene-vinyl buterate, silicone(s) and polyurethane(s).

14. A glazing assembly according to claim 1, wherein said polymer matrix contains at least three elastomers (A) each having different molar mass greater than or equal to 20,000.

15. A glazing assembly according to claim 1, wherein said polymer matrix contains at least one plasticizer (B), of molar mass less than or equal to 10,000.

* * * * *